US012603524B2

(12) United States Patent
Ganesh et al.

(10) Patent No.: US 12,603,524 B2
(45) Date of Patent: Apr. 14, 2026

(54) POWER TRANSMITTER PROTECTION FOR RECEIVER FAULT IN A WIRELESS POWER SYSTEM

(71) Applicant: GE Intellectual Property Licensing, LLC, Niskayuna, NY (US)

(72) Inventors: Jayanti Ganesh, Bangalore (IN); Viswanathan Kanakasabai, Bangalore (IN); Subbarao Tatikonda, Bangalore (IN)

(73) Assignee: GE Intellectual Property Licensing, LLC, Niskayuna, NY (US)

( * ) Notice: Subject to any disclaimer, the term of this patent is extended or adjusted under 35 U.S.C. 154(b) by 81 days.

(21) Appl. No.: 18/292,648

(22) PCT Filed: Sep. 8, 2022

(86) PCT No.: PCT/US2022/042955
§ 371 (c)(1),
(2) Date: Jan. 26, 2024

(87) PCT Pub. No.: WO2023/039100
PCT Pub. Date: Mar. 16, 2023

(65) Prior Publication Data
US 2024/0348099 A1 Oct. 17, 2024

Related U.S. Application Data

(60) Provisional application No. 63/242,102, filed on Sep. 9, 2021.

(51) Int. Cl.
| | |
|---|---|
| *H02J 50/12* | (2016.01) |
| *H02J 7/00* | (2006.01) |
| *H02J 50/80* | (2016.01) |

(52) U.S. Cl.
CPC ............ *H02J 50/12* (2016.02); *H02J 7/0029* (2013.01); *H02J 7/0047* (2013.01); *H02J 50/80* (2016.02)

(58) Field of Classification Search
CPC .................................. H02J 50/12; H02J 50/80
See application file for complete search history.

(56) References Cited

U.S. PATENT DOCUMENTS

| | | |
|---|---|---|
| 9,337,666 B2 | 5/2016 | Low et al. |
| 10,325,717 B2 | 6/2019 | Boys et al. |
| | (Continued) | |

FOREIGN PATENT DOCUMENTS

| | | |
|---|---|---|
| WO | 2023039100 | 3/2023 |
| WO | 2023039102 | 3/2023 |

OTHER PUBLICATIONS

"PCT Application No. PCT/US2022/042955 International Search Report and Written Opinion", Dec. 13, 2022, 10 pages.
(Continued)

*Primary Examiner* — Rexford N Barnie
*Assistant Examiner* — Joseph N Inge
(74) *Attorney, Agent, or Firm* — DeLizio, Peacock, Lewin & Guerra, LLP

(57) ABSTRACT

This disclosure provides systems, methods and apparatuses for a wireless power transmission apparatus to detect a fault of the wireless power reception apparatus. Various implementations relate generally to fault detection and mitigation in a wireless power system. In some aspects, a transmission (TX) controller of the wireless power transmission apparatus can detect a fault in the wireless power reception apparatus based on power transfer measurements or calculations in the wireless power transmission apparatus. The techniques may enable the wireless power transmission apparatus to detect faults such as an open circuit in the wireless power reception
(Continued)

apparatus or a thermostat failure, among other examples. During the transmission of wireless power, the wireless power transmission apparatus may detect the fault and cease the transmission of wireless power.

26 Claims, 10 Drawing Sheets

(56) References Cited

U.S. PATENT DOCUMENTS

| | | | | |
|---|---|---|---|---|
| 10,811,907 | B2 | 10/2020 | Du et al. | |
| 2015/0236757 | A1 | 8/2015 | Lee et al. | |
| 2017/0063161 | A1* | 3/2017 | Sugiyama | H02J 50/80 |
| 2019/0222064 | A1 | 7/2019 | Du et al. | |
| 2020/0006987 | A1* | 1/2020 | Moffatt | H02J 7/0049 |
| 2020/0195308 | A1* | 6/2020 | Lee | H02J 50/12 |
| 2021/0257866 | A1* | 8/2021 | Lee | H02J 50/12 |
| 2021/0281099 | A1* | 9/2021 | Wan | H02J 50/80 |
| 2021/0351628 | A1 | 11/2021 | Araujo et al. | |

OTHER PUBLICATIONS

"PCT Application No. PCT/US2022/042957 International Search Report and Written Opinion", Jan. 3, 2023, 10 pages.

Low, et al., "Method of Load/Fault Detection for Loosely Coupled Planar Wireless Power Transfer System With Power Delivery Tracking", IEEE Transactions on Industrial Electronics, vol. 57, No. 4, Apr. 4, 2010, Apr. 4, 2010, 9 pages.

Yan, et al., "Fault-Tolerant Wireless Power Transfer System with a Dual-Coupled LCC-S Topology", IEEE Transactions on Vehicular Technology, vol. 68, Dec. 12, 2019, Dec. 12, 2019, 9 pages.

* cited by examiner

200

102
WIRELESS POWER
TRANSMISSION
APPARATUS

118
WIRELESS POWER
RECEPTION
APPARATUS

200
DETECT WIRELESS POWER
RECEPTION APPARATUS

INFORMATION REQUEST SIGNAL                          210

ID AND CONFIGURATION INFORMATION                    220

WIRELESS POWER TRANSMISSION                          230

POWER
TRANSFER
PHASE

235

POWER CONTROL COMMUNICATIONS
(SUCH AS CONTROL ERROR PACKETS)                     240-1

240-2

240-3

240-4

245

CEASE WIRELESS POWER
TRANSMISSION                            250

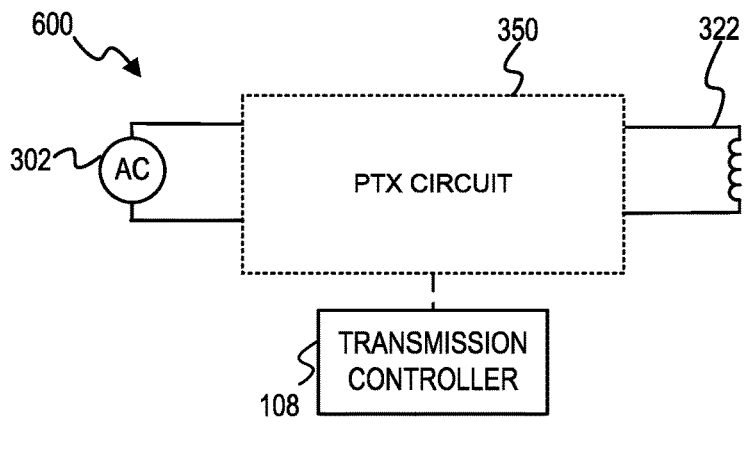

600

350

322

302 — (AC)

PTX CIRCUIT

TRANSMISSION CONTROLLER

712 — TX INVERTER VOLTAGE/CURRENT

714 — POWER TRANSFER PERIOD TIMER

722 — TRANSMITTER CHARACTERISTICS

708

718 — TRANSMITTER POWER MEASUREMENT

728 — EXPECTED POWER TRANSMISSION LOSS

730 — POWER TRANSFER AMOUNT (TRANSMITTED POWER)

738 — FAULT DETECTION THRESHOLD

750 — POWER TRANSFER AMOUNT BELOW FAULT DETECTION THRESHOLD?

NO

YES

760 — DETERMINE THAT FAULT OF THE RECEIVER IS DETECTED

FIGURE 7

POWER TRANSMISSION PERIODS

1000

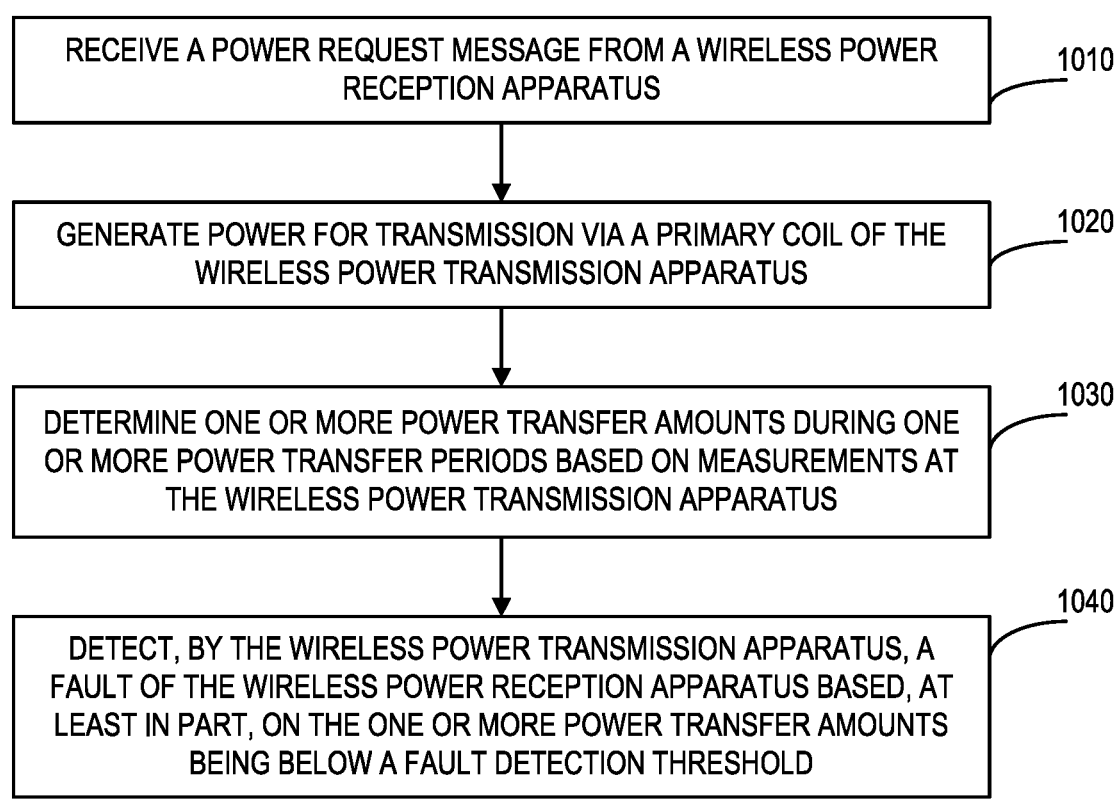

| | |
|---|---|
| RECEIVE A POWER REQUEST MESSAGE FROM A WIRELESS POWER RECEPTION APPARATUS | 1010 |
| GENERATE POWER FOR TRANSMISSION VIA A PRIMARY COIL OF THE WIRELESS POWER TRANSMISSION APPARATUS | 1020 |
| DETERMINE ONE OR MORE POWER TRANSFER AMOUNTS DURING ONE OR MORE POWER TRANSFER PERIODS BASED ON MEASUREMENTS AT THE WIRELESS POWER TRANSMISSION APPARATUS | 1030 |
| DETECT, BY THE WIRELESS POWER TRANSMISSION APPARATUS, A FAULT OF THE WIRELESS POWER RECEPTION APPARATUS BASED, AT LEAST IN PART, ON THE ONE OR MORE POWER TRANSFER AMOUNTS BEING BELOW A FAULT DETECTION THRESHOLD | 1040 |

*FIGURE 10*

POWER TRANSMITTER PROTECTION FOR RECEIVER FAULT IN A WIRELESS POWER SYSTEM

RELATED APPLICATIONS

This application is a National Stage Entry of International Patent Application Serial No. PCT/US2022/042955, filed on Sep. 8, 2022, which claims priority benefit of U.S. Provisional Application No. 63/242,102 filed Sep. 9, 2021, entitled "Fault Detection in Wireless Power System" and assigned to the assignee hereof. The disclosure of the aforementioned application is considered part of and is incorporated by reference in this Patent Application.

TECHNICAL FIELD

This disclosure relates generally to wireless power. More specifically, this application relates to fault detection a wireless power system.

DESCRIPTION OF RELATED TECHNOLOGY

A wireless power system may include a wireless power transmission apparatus (sometimes also referred to as a Power Transmitter, or PTx) and a wireless power reception apparatus (sometimes also referred to as a Power Receiver, or PRx). For example, the wireless power transmission apparatus may be installed on or included in a countertop or other flat surface. The wireless power reception apparatus may be included in a cordless appliance, such as a blender, a kettle, an air fryer, a mixer, or a toaster, among other examples. The wireless power transmission apparatus may include a primary coil that produces an electromagnetic field that may induce a voltage in a secondary coil of the wireless power reception apparatus when the secondary coil is placed in proximity to the primary coil. In this configuration, the electromagnetic field may wirelessly transfer power to the secondary coil. The power may be transferred using inductive coupling or resonant coupling between the primary coil and the secondary coil. The wireless power reception apparatus may provide the received power to operate the cordless appliance.

SUMMARY

The systems, methods, and apparatuses of this disclosure each have several innovative aspects, no single one of which is solely responsible for the desirable attributes disclosed herein.

One innovative aspect of the subject matter described in this disclosure can be implemented as a method by a Power Transmitter of a wireless power system. The method may include generating power for transmission from the Power Transmitter to a Power Receiver of the wireless power system. The method may include calculating one or more power transfer amounts for one or more power transfer periods based, at least in part, on measurements of voltage and current associated with the power generated at the Power Transmitter. The method may include protecting, by the Power Transmitters, against a fault of the Power Receiver when the one or more power transfer amounts are below a threshold during a power transfer phase.

Another innovative aspect of the subject matter described in this disclosure can be implemented as a Power Transmitter of a wireless power system. The Power Transmitter may include a power transmitter circuit configured to generate power for transmission from the Power Transmitter to a Power Receiver. The Power Transmitter may include a transmission controller configured to calculate one or more power transfer amounts for one or more power transfer periods based, at least in part, on measurements of voltage and current associated with the power generated at the Power Transmitter, protect against a fault of the Power Receiver when the one or more power transfer amounts are below a threshold during a power transfer phase.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6 shows a block diagram conceptually illustrating an example wireless power transmission apparatus in which a transmission controller can detect a fault based on power measurements.

FIG. 7 shows a block diagram conceptually illustrating a transmission controller detecting a fault of the wireless power reception apparatus based on measurements at the wireless power transmission apparatus.

FIG. 10 shows a flow diagram illustrating example operations of a process in an example wireless power transmission apparatus for detecting a fault of the wireless power reception apparatus.

Figure 1:
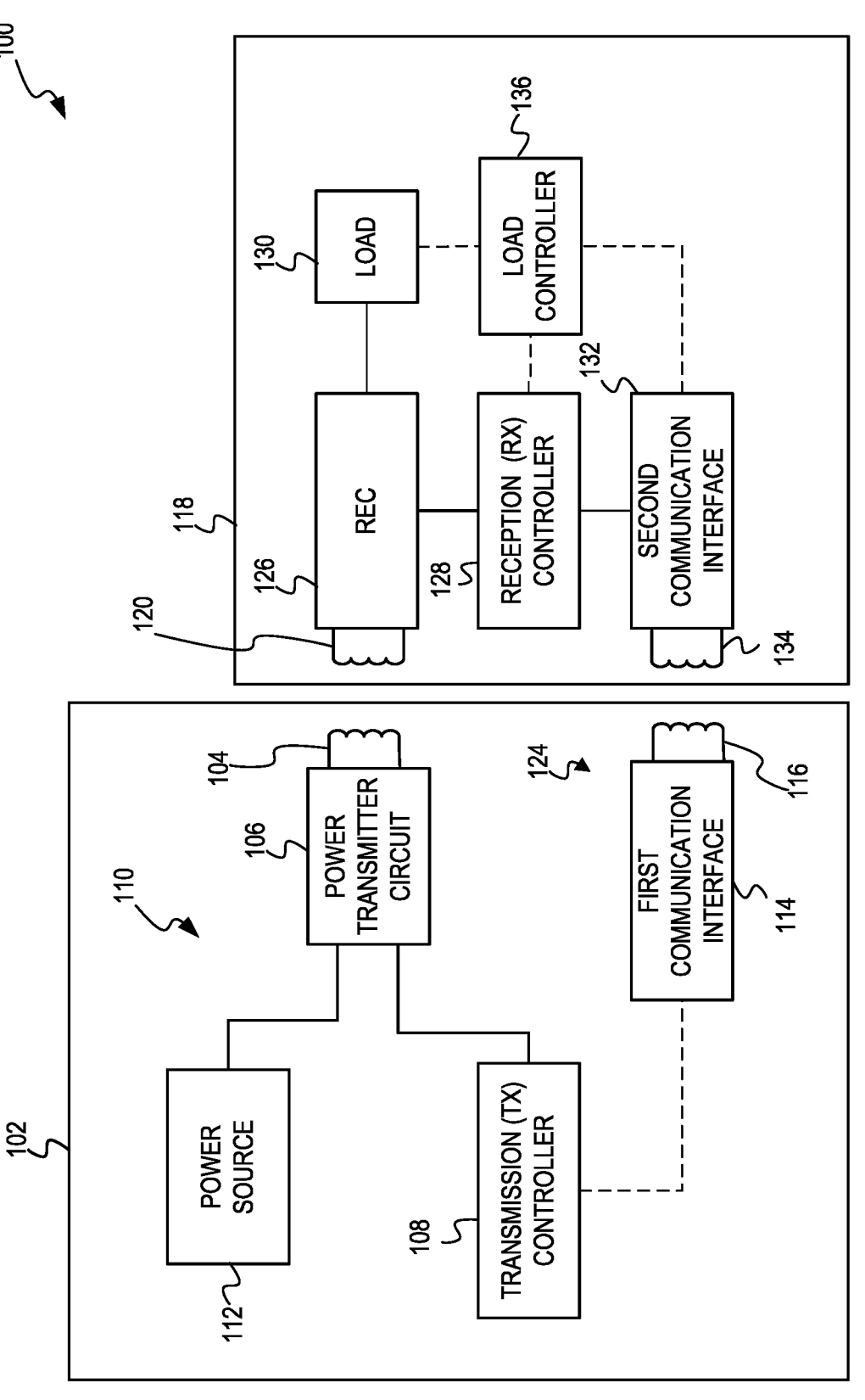
FIG. 1 shows a block diagram of an example wireless power system that includes an example wireless power transmission apparatus and an example wireless power reception apparatus.

Note that the relative dimensions of the figures may not be drawn to scale.

DETAILED DESCRIPTION

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system, or method for transmitting or receiving wireless power.

A wireless power system may include a wireless power transmission apparatus (sometimes referred to as a Power Transmitter, or PTx) integrated with or otherwise disposed on a surface. The wireless power system also may include a wireless power reception apparatus (sometimes referred to as a Power Receiver, or PRx). The wireless power transmission apparatus may include a primary coil configured to wirelessly transmit power via a magnetic field to a secondary coil in the wireless power reception apparatus. In some implementations, the wireless power transmission apparatus may include a countertop-mounted primary coil or a primary coil that is embedded or manufactured in a surface on which a cordless appliance can be placed. The cordless appliance may include a wireless power reception apparatus for wirelessly receiving power. A secondary coil of the wireless power reception apparatus may obtain wireless energy from the magnetic field and provide it to a power receiving circuit. The power receiving circuit may convert the energy and utilize it to charge or power a load. A wireless power reception apparatus may be included or integrated with a cordless appliance having a variable load (such as a blender, heating element, a fan, among other examples).

During a power transfer phase, the wireless power reception apparatus may periodically communicate power control communication to the wireless power transmission apparatus via a communication channel. The power control communications may indicate presence or status, among other examples. For example, the power control communications may include a power request, a null communication (to indicate presence without feedback), or power receiver feedback. In some circumstances, the communication channel may continue to function properly despite a failure associated with the wireless power reception apparatus. For example, the wireless power transmission apparatus and the wireless power reception apparatus may communicate via Near Field Communication (NFC), Bluetooth™, or other communications technique that could continue to function even when power transfer circuits have failed. Thus, in some scenarios, the wireless power reception apparatus may continue to communicate power control communications to the wireless power transmission apparatus via the communication channel even when all or part of a power receiving circuit in the wireless power reception apparatus is not functioning properly. The wireless power transmission apparatus may protect itself and the cordless appliance from an abnormal condition. Examples of abnormal conditions contemplated in this disclosure include a series element failure resulting in an open circuit (also referred to as a fault), a communication loss, or a corrupt control unit or sensor, among other examples. In some instances, a cordless appliance may not have the means to know if a heating element, a thermal fuse, or other element has failed, resulting in an open circuit in the appliance. Some types of cordless appliances (such as a water kettle, for example) may implement a basic control architecture (referred to as type 1 control architecture) in which basic communication is independent from operations of the load. In some instances, a cordless appliance may experience a failure such as an open circuit failure of the load disconnect switch, an open diode in the converter, a blown fuse, or open relay contacts. Absent the techniques of this disclosure, the wireless power transmission apparatus would otherwise continue to transmit wireless power that is absorbed by metallic components of the wireless power reception apparatus. This can lead to overheating, damage to the wireless power reception apparatus, or fire, among other potentially dangerous outcomes.

This disclosure provides systems, methods and apparatuses for a wireless power transmission apparatus to detect a fault of the wireless power reception apparatus. Various implementations relate generally to fault protection in a wireless power system. In some aspects, a transmission (TX) controller of the wireless power transmission apparatus can detect a fault of the wireless power reception apparatus based on power transfer measurements or calculations in the wireless power transmission apparatus. The techniques may enable the wireless power transmission apparatus to detect faults such as an open circuit in the wireless power reception apparatus or a thermostat failure, among other examples. During the transmission of wireless power, the wireless power transmission apparatus may detect the fault and cease the transmission of wireless power. Using the techniques of this disclosure, the wireless power transmission apparatus can detect the fault regardless of whether the wireless power transmission apparatus receives power control communications from a communication unit of the wireless power reception apparatus.

In some aspects, a wireless power transmission apparatus may detect a fault (such as an open circuit fault) of the wireless power reception apparatus based on measurements at the wireless power transmission apparatus. For example, the wireless power transmission apparatus may obtain voltage and current measurements at a component (such as an inverter) of a power transmitter circuit. The wireless power transmission apparatus may calculate an average transmitter power based on the voltage and current measurements. In some implementations, the wireless power transmission apparatus may adjust the average transmitter power based on known characteristics of the wireless power transmission apparatus such as an expected power transmission loss associated with components of the wireless power transmission apparatus. The wireless power transmission apparatus can calculate a power transfer amount (sometimes also referred to as Transmitted Power) as a difference between the average transmitter power and the expected power transmission loss. When the power transfer amount is lower than expected (such as lower than a fault detection threshold), the wireless power transmission apparatus may determine that the wireless power reception apparatus has an open circuit fault in the receiver. The open circuit fault may include a fault in the power receiver circuit (such as at the load or a rectifier) in the wireless power reception apparatus. In some implementations, the power transfer amount may be based on measurements in the wireless power transmission apparatus so that the fault detection by the wireless power transmission apparatus is not dependent on a fault detection technique of the wireless power reception apparatus. When the power transfer amount is below a fault detection threshold, the wireless power transmission apparatus may suspect a fault in the wireless power reception apparatus.

In some aspects, the wireless power transmission apparatus may adjust one or more operating parameters (such as an operating frequency, an operating voltage, or an operating duty (sometimes also referred to as a duty cycle), among other examples) and determine whether the power transfer amount remains below the fault detection threshold. The wireless power transmission apparatus may determine the fault based on one instance or a plurality of instances when the power transfer amount is below the fault detection threshold. Each instance may be an indication of the fault. In some implementations, the wireless power transmission apparatus may attempt different operating parameters over a fault detection time period. The wireless power transmission apparatus may determine the fault after a threshold quantity of indications or after the fault detection time period during which the power transfer amount remains below the fault detection threshold.

In some aspects, the wireless power transmission apparatus may implement one or more fault handling actions. In some implementations, the wireless power transmission apparatus may communicate a fault message to the wireless power reception apparatus. The wireless power reception apparatus may cease operation of a load, provide a user interface indication of the fault, or otherwise react to the fault message to prevent a potentially dangerous situation that would otherwise result from continued wireless power transfer.

Particular implementations of the subject matter described in this disclosure can be implemented to realize one or more of the following potential advantages. A fault of the wireless power reception apparatus may be detected by the wireless power transmission apparatus to prevent overheating, damage, or fire. The fault detection described in this disclosure can supplement or replace fault detection techniques performed by the wireless power reception apparatus. Even if the wireless power reception apparatus has fault detection techniques, those receiver-side techniques may fail. Thus, transmitter-side techniques for detecting a fault of the wireless power reception apparatus may improve the safety of the wireless power system.

While the examples in this disclosure are based on wireless power used in kitchen systems, the techniques are applicable to other types of systems. For example, the techniques may be used with wireless power systems associated with home appliances, electronic devices, fans, space heaters, speaker systems, air compressors, garden equipment, or components of an electric vehicle, among other examples.

FIG. 1 shows a block diagram of an example wireless power system that includes an example wireless power transmission apparatus and an example wireless power reception apparatus. In FIG. 1, dashed lines represent communications to distinguish from solid lines that represent electrical circuit lines.

The wireless power system 100 includes a wireless power transmission apparatus 102 and a wireless power reception apparatus 118. The wireless power transmission apparatus 102 includes a primary coil 104. The primary coil 104 may be associated with a power transmitter circuit 106 (sometimes also referred to as a power signal generator). The primary coil 104 may be a wire coil which transmits wireless power (which also may be referred to as wireless energy). The primary coil 104 may transmit wireless energy using inductive or magnetic resonant field. The power transmitter circuit 106 may include components (not shown) to prepare the wireless power. For example, the power transmitter circuit 106 may include one or more switches, drivers, series capacitors, rectifiers, inverters, or other components.

In some implementations, the power transmitter circuit 106, TX controller 108 and other components (not shown) may be collectively referred to as a power transmitter unit 110. Some or all of the power transmitter unit 110 may be embodied as an integrated circuit (IC) that implements features of this disclosure for controlling and transmitting wireless power to one or more wireless power reception apparatuses. The TX controller 108 may be implemented as a microcontroller, dedicated processor, integrated circuit, application specific integrated circuit (ASIC) or any other suitable electronic device.

The power source 112 may provide power to the power transmitter unit 110 in the wireless power transmission apparatus 102. In some implementations, the power source 112 may convert alternating current (AC) power to direct current (DC) power. For example, the power source 112 may include a converter that receives an AC power from an external power supply and converts the AC power to a DC power used by the power transmitter circuit 106. Alternatively, or additionally, a component (such as an inverter) of the power transmitter circuit 106 may convert the DC power to the AC power.

The TX controller 108 is connected to a first communication interface 114. The first communication interface 114 is connected to a first communication coil 116. In some implementations, the first communication interface 114 and the first communication coil 116 may be collectively referred to as the first communication unit 124. In some implementations, the first communication unit 124 may support Near-Field Communication (NFC). NFC is a technology by which data transfer occurs on a carrier frequency of 13.56 Megahertz (MHz). The first communication unit 124 also may support any suitable communication protocol.

The wireless power reception apparatus 118 may include a secondary coil 120, a rectifier 126, a reception (RX) controller 128, a second communication interface 132, a load controller 136, a load 130, and a memory (not shown). In some implementations, the load 130 may also include a drive (not shown) for controlling at least one parameter such as speed or torque of the load. In some implementations, the rectifier 126 may be omitted. In some implementations, a series switch (not shown) may be included in series with the secondary coil 120. Although shown as different components, some components may be packaged or implemented in the same hardware. For example, in some implementations, the RX controller 128 and the load controller 136 may be implemented as a single controller. The RX controller 128, the load controller 136, or any combination thereof, may be implemented as a microcontroller, dedicated processor, integrated circuit, application specific integrated circuit (ASIC) or any other suitable electronic device.

The TX controller 108 may detect the presence or proximity of a wireless power reception apparatus 118. This detection may happen during a periodic pinging process of the first communication interface 114 in the wireless power transmission apparatus 102. During the pinging process, the first communication interface 114 also may supply power (via the first communication coil 116) to the second communication interface 132 (via the second communication coil 134) when the wireless power reception apparatus 118 is in proximity. The second communication interface 132 may "wake up" and power-up the RX controller 128 and may send a reply signal back to the first communication interface 114. Prior to power transfer, a handshaking process may take place during which the TX controller 108 may receive data configuration related to the power rating of the receiver, among other information.

Different cordless appliances have different load types, different load states, and different power requirements or may require power at a particular voltage and frequency. For example, a cordless blender may include a variable motor load that has multiple user-selectable load states to control motor speed. In some implementations, a cordless appliance may have user-selectable load states or user-selectable load patterns of operation. Depending on the load state, the cordless blender may require different levels of power to operate. In another example, a cordless kettle may include a resistive load that has different load states to control temperature. In yet another example, an air fryer may be a compound load device and may operate a heater, a fan, or both, at various periods of operation. Each type of load (such as the motor, the resistive load, the heater, the fan, or any combination thereof) may require different amounts of power to operate based on a current load state or load state. Furthermore, cordless appliances may exhibit different levels of voltage gains from a primary coil to a receiver coil at different primary coil excitation frequencies (such as a wireless power transfer frequency) depending on their load type or load state. For example, to achieve a desired load voltage, a cordless blender may operate best at a first operating frequency for a first load state, such as a low motor speed setting. However, as the load state changes, the cordless blender may not achieve the same load voltage when operated at the first operating frequency. For example, the first operating frequency may facilitate a first voltage gain when the cordless blender is set to a first load state (such as a low-speed setting), but the first operating frequency may provide a lower voltage gain when the cordless blender is set to a second setting (such as a higher-speed setting).

Another factor that may alter voltage gain is based on an alignment of the secondary coil 120 and the primary coil 104 during power transfer. Voltage gain may be measured in terms a ratio of voltage received by the secondary coil 120 to voltage applied at the primary coil 104. Wireless power transmission is more efficient when the primary and secondary coils are optimally aligned. Conversely, the efficiency may decrease (or the power transmission may cease) when the primary and secondary coils are misaligned. When properly aligned, primary coils and secondary coils can transfer wireless energy up to an amount predetermined by a wireless standard. For example, with proper alignment, a primary coil may convey power ranging from 30 Watts (W) up to 2.2 Kilowatts (KW). Because alignment affects the efficiency of power transmission, the wireless power transmission apparatus may modify the amount of wireless power based on its alignment with the wireless power reception apparatus.

The TX controller 108 may control characteristics of wireless power it provides to the wireless power reception apparatus 118. After detecting the wireless power reception apparatus 118, the TX controller 108 may receive configuration data from a wireless power reception apparatus 118. For example, the TX controller 108 may receive the configuration data during a hand shaking process with the wireless power reception apparatus 118.

In some implementations, the wireless power reception apparatus 118 may be included in a cordless appliance, such as a cordless blender, cordless kettle, cordless juicer, etc. The wireless power reception apparatus 118 may include a secondary coil 120, a rectifier 126, and an RX controller 128. When the secondary coil 120 is aligned to the primary coil 104, the secondary coil 120 may generate an induced voltage based on a received wireless power signal from the primary coil 104. A capacitor may be in series between the secondary coil 120 and the rectifier 126. The rectifier 126 may rectify the induced voltage and provide the induced voltage to a load 130. The load 130 may be any suitable load such as a variable motor load, variable resistive load or a variable induction heating load. The load may include an additional electronic drive (not shown).

A RX controller 128 may be operationally coupled to the rectifier 126 and the second communication interface 132. The second communication interface 132 may contain modulation and demodulation circuits to wirelessly communicate via the second communication coil 134. Thus, the RX controller 128 may wirelessly communicate with the feedback controller 122 via the second communication interface 132 to the first communication interface 114 using NFC communications. Alternatively, or additionally, the RX controller 128 may use load modulation to communicate via an in-band communication link (not shown) that includes the secondary coil 120.

A load controller 136 may be operationally coupled to the load 130 and the second communication interface 132. The load controller 136 may detect changes to load states. For example, the load controller 136 may detect changes to user-selectable load states, such as temperature selectors and motor speed selectors. The load controller 136 also may determine a load voltage reference and load state based on the power estimate. The load controller 136 also may provide load states, load voltage references and any other suitable information to the RX controller 128 or the second communication interface 132 for communication to the wireless power transmission apparatus 102. The RX controller 128 may additionally determine and provide feedback information indicating a measured load voltage available to the load 130. In some feedback messages, the feedback information may include a reference voltage indicating a required voltage for the load 130. In some feedback messages, the feedback information may include the required power for the load. Although the RX controller 128 and load controller 136 are shown separately, they may be included in the same component of the wireless power reception apparatus 118.

Figure 2:
FIG. 2 shows a message flow diagram of an example wireless power transmission process.

FIG. 2 shows a message flow diagram of an example wireless power transmission process. Referring to FIG. 2, a wireless power transmission apparatus 102 detects that a wireless power reception apparatus 118 is located in a charging area in a standby mode (S200). There may be various methods for detecting the wireless power reception apparatus 118 by the wireless power transmission apparatus 102, and not limited to a specific method in the present disclosure. As an example, the wireless power transmission apparatus 102 may detect that the wireless power reception apparatus 118 is located in a charging area by periodically emitting analog ping of a specific frequency, and based on detection current for this, resonance shift or capacitance change. As another example, the wireless power transmission apparatus 102 may periodically transmits a detection signal and the wireless power reception apparatus 118 may transmits a response signal (for example, a control error packet or a signal strength packet). The wireless power transmission apparatus 102 may detect that the wireless power reception apparatus 118 is located in the charging area based on receiving the response signal within a predetermined time period following the detection signal. As yet another example, the wireless power reception apparatus 118 may transmit a searching signal or an advertisement signal to the wireless power transmission apparatus 102. The searching signal or the advertisement signal may traditionally be transmitted using short range radio frequency communication (such as NFC or Bluetooth™). The wireless power transmission apparatus 102 may detect the wireless power reception apparatus 118 based on reception of the searching signal or the advertisement signal.

In some implementations, as a preparation step for a wireless power transmission, the wireless power transmission apparatus 102 may optionally transmit an information request signal to the wireless power reception apparatus (S210). The information request signal may be a signal for requesting an ID and request power information of the wireless power reception apparatus 118. As an example, the information request signal may be transmitted in a form of data packet message. As another example, the information request signal may be transmitted in a form of digital ping according to a predefined standard between the wireless power transmission apparatus 102 and the wireless power reception apparatus 118. In response to the information request signal, the wireless power reception apparatus 118 may optionally transmit the ID and configuration information to the wireless power transmission apparatus 102 (S220). For example, the configuration information may include a requested amount of power or a maximum amount of power that is provided for the wireless power reception apparatus 118. In some implementations, the configuration information may include a rated power value associated with the load or an operation of the load. In some implementations, the configuration information also may include a time parameter. For example, the time parameter may indicate an expected time for the wireless power reception apparatus to complete the operation based on the rated power value. In some implementations, the information request signal and the ID and configuration information may be communicated using out-of-band communication (separate from the wireless power signal) such as NFC or Bluetooth.

Based on the ID and configuration information, the wireless power transmission apparatus 102 configures parameters (referred to as an operating point) for power transmission and performs a wireless power transmission to the wireless power reception apparatus 118 (S230). For example, the wireless power transmission apparatus may create a power transmission contract based on the ID and the configuration information and may control the wireless power transmission according to the power transmission contract. The process, performed by the wireless power transmission apparatus 102, from the start to the end of the wireless power transmission to the wireless power reception apparatus may be called a (wireless) power transfer phase 235. In some implementations, the wireless power reception apparatus 118 may provide the received wireless power to an external load such as a heating element, motor, or battery, among other examples. In some implementations, an operation of the wireless power reception apparatus 118 may be based on the external load and a user-configurable setting. For example, the operation may include boiling water, toasting bread, or cooking food. In other examples, the operation may be based on charging a battery or other energy storage device to a desired level.

The wireless power transmission apparatus 102 may monitor the parameters for power transmission and may abort the wireless power transmission when any one of the parameters exceeds a stated limit. Alternatively, the wireless power transmission process of S230 may be ended by a request of the wireless power reception apparatus 118. For example, the wireless power reception apparatus 118 may transmit a signal for requesting termination of the wireless power transmission to the wireless power transmission apparatus 102, when the operation of the wireless power reception apparatus 118 is complete.

During the power transfer phase 235, the wireless power reception apparatus 118 periodically transmits power control communications to the wireless power transmission apparatus 102 (shown at S240-1, S240-2, S240-3, and S240-4). Examples of a power control communication may include a control error packet (CEP), a power request message, or a status message, among other examples. This is performed for controlling an amount of power which is transmitted from the wireless power transmission apparatus 102 to the wireless power reception apparatus 118, that is, to perform a power control.

As described herein, there are circumstances in which the wireless power reception apparatus 118 may continue to transmit power control communications even though the receiver electronics of the wireless power reception apparatus 118 have failed. Since the power control communications may be transmitted by a communication unit via an out-of-band communication channel, the communication may be operational despite a hardware failure that could prevent the wireless power reception apparatus 118 from properly receiving and processing the wireless power. For example, the load (such as a heating element) may have an open circuit fault, electronics (such as rectifier) may have open circuit fault, a thermostat failure may fail to detect an overheating situation, or other failure in the receiver can result in a failure to process the wireless power transmission. Meanwhile, the wireless power reception apparatus 118 may continue to transmit power control communications that the wireless power transmission apparatus 102 may interpret as a request to continue transmitting wireless power. In accordance with this disclosure, the wireless power transmission apparatus 102 may detect such failures (S245) and act to cease wireless power transmission (S250). This disclosure includes several techniques by which the wireless power transmission apparatus 102 can detect a failure in the wireless power reception apparatus 118 regardless of whether the wireless power reception apparatus 118 continues to transmit power control communications.

Figure 3:
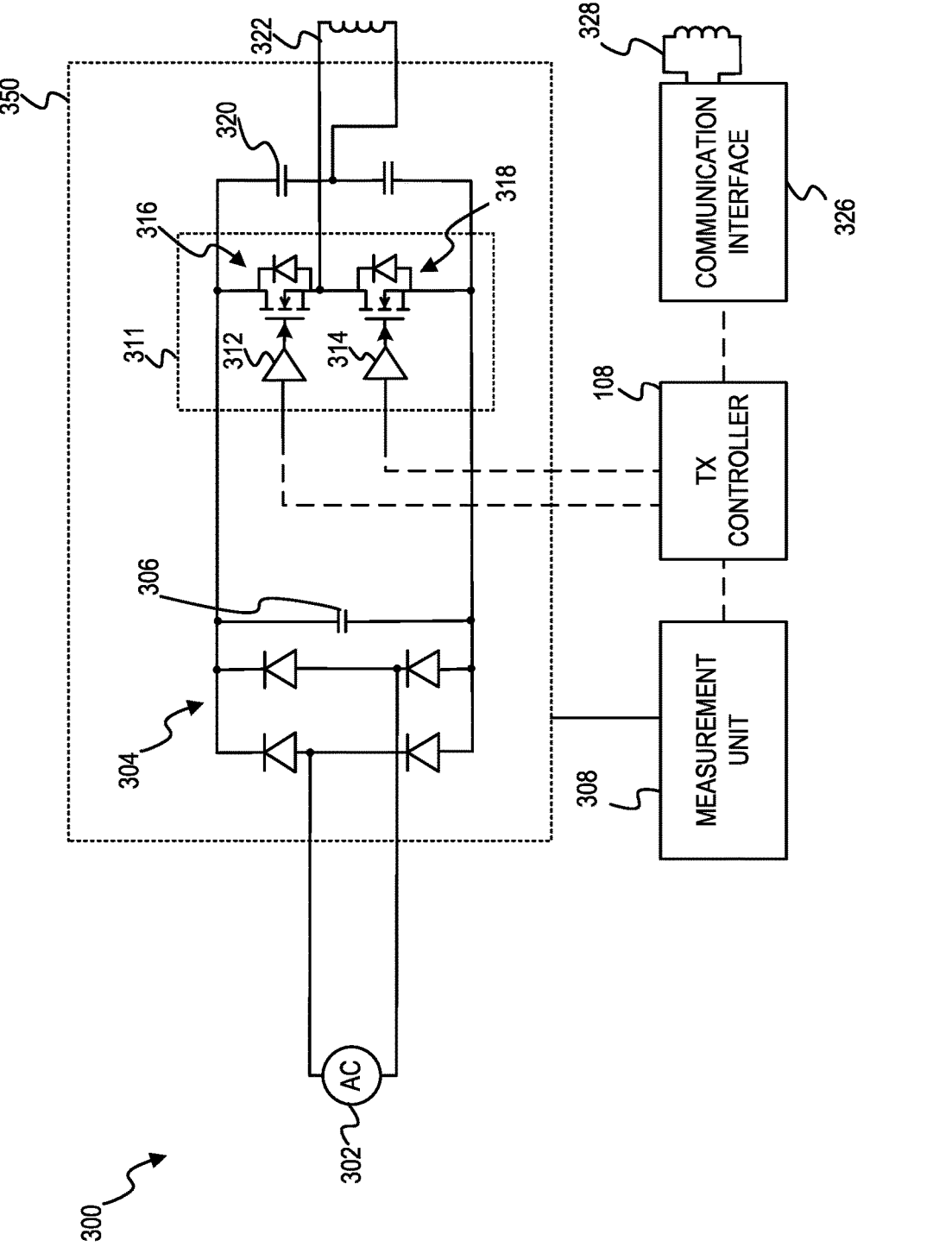
FIG. 3 shows a block diagram conceptually illustrating an example wireless power transmission apparatus.

FIG. 3 shows a block diagram conceptually illustrating an example wireless power transmission apparatus 300. The wireless power transmission apparatus 300 may be an example of the wireless power transmission apparatus 102 described with reference to FIGS. 1 and 2, respectively. The wireless power transmission apparatus 300 may include a power source 302, which is shown as an AC power source. However, the power source 302 may be a DC power source or any other suitable source power. The power source 302 may be connected to a rectifier 304 (which also may be referred to bridge rectifier, or other related terms). The rectifier 304 which may be connected to a capacitor 306. The rectifier 304 may provide DC power to a first switch 316 and a second switch 318. The first switch 316 and second switch 318 together form an inverter 311 that generates an AC voltage from the DC power. The first switch 316 and the second switch 318 may be metal-oxide-semiconductor field-effect transistors (MOSFETs) or Insulated Gate bipolar Transistors (IGBTs), among other examples. A first pulse width modulator (PWM) driver 312 may be connected to the first switch 316, and a second PWM driver 314 may be connected to the second switch 318. The TX controller 108 may be connected to the first PWM driver 312 and the second PWM driver 314. The TX controller 108 may control the PWM drivers 312 and 314 to cause wireless power transmission according to a desired operating frequency, operating duty, or operating frequency, among other examples. The wireless power transmission apparatus 300 may include other components (such as capacitors 320) in the path between the power source 302 and a primary coil 322. The rectifier 304, capacitor 306, inverter switches 316 and 318, and capacitors 320 may be collectively referred to as the power transmitter (PTx) circuit 350. The TX controller 108 controls one or more components of the PTx circuit 350 to manage the transmission of wireless power.

The TX controller 108 may exchange communications with a wireless power reception apparatus via a communication unit. The communication unit may include a communication interface 326, a communication controller (not shown) or other component connected to a communication coil 328. In some implementation, the communication interface 326 and the communication coil 328 are configured to communicate using an NFC communication protocol. In some implementations, the communication interface 326 and the TX controller 108 may be collocated in a common processor or chip.

The TX controller 108 may detect the wireless power reception apparatus in proximity to the primary coil 322 and conduct a handshaking process during which the TX controller 108 receives information from the wireless power reception apparatus. The TX controller 108 may receive the information via the communication interface 326. In some implementations, the information may include one or more reference control parameters such as operating frequencies of the wireless power reception apparatus at different reference coupling factors (K-factors), load voltages and load powers of the wireless power reception apparatus. In some implementations, the information may indicate a load type and a load state for a variable load associated with the wireless power reception apparatus. Load state represents the combined state of load voltage and corresponding load power of the appliance. The TX controller 108 may utilize this information to provide wireless power having characteristics that enable the wireless power reception apparatus to operate. For example, the TX controller 108 may determine an operating parameter and provide wireless power by controlling the first and second PWM drivers (312 and 314, respectively) based on the operating parameter. The PWM drivers (312 and 314, respectively) may operate the first switch 316 and the second switch 318. The first switch 316 and second switch 318 may energize the primary coil 322 in a manner that transmits wireless power according to the operating parameter to a secondary coil of the wireless power reception apparatus.

In accordance with techniques of this disclosure, the TX controller 108 can detect a fault in the wireless power reception apparatus by monitoring the amount of wireless power transferred via the PTx circuit 350. The wireless power transmission apparatus 300 may include a measurement unit 308. The measurement circuit 308 may measure one or more characteristics (such as voltage, current, or both) through the PTx circuit 350. In some implementations, the measurement circuit may be connected to the rectifier (such as either on the power source 302 side as shown in FIG. 3 or on the wireless power transmission circuit side). In some implementations, the measurement unit 308 may be configured to measure a voltage and current through the rectifier 304 or the inverter 311. As described further in this disclosure, the measurements may be used to determine a power transfer amount during a power transfer phase. In some implementations, when the power transfer amount is less than a threshold, the TX controller 108 may infer that the wireless power reception apparatus has experienced a fault condition (such as an open circuit fault). Alternatively, or additionally, when any measurement of the current through the primary coil 322 is above an overcurrent threshold (such as an instantaneous over current condition), the TX controller 108 may infer that the wireless power reception apparatus has experienced a fault condition.

Figure 4:
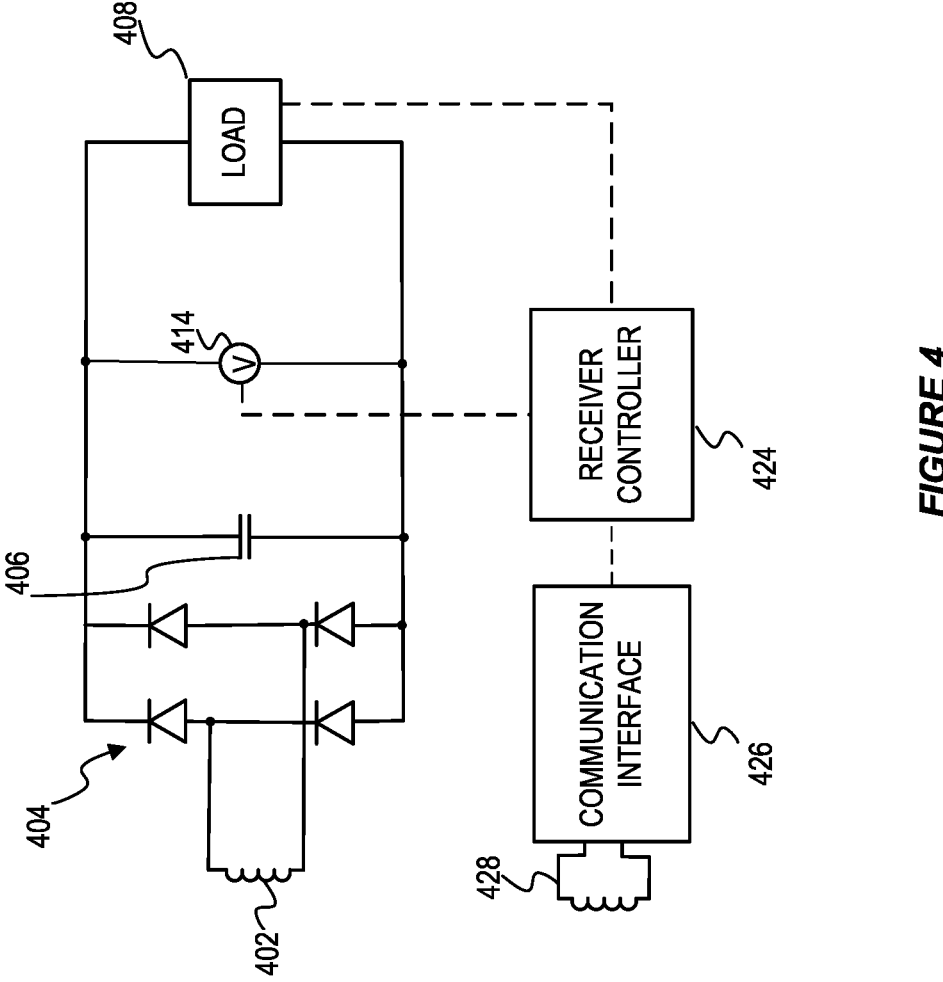
FIG. 4 shows a block diagram conceptually illustrating an example wireless power reception apparatus.

FIG. 4 shows a block diagram conceptually illustrating an example wireless power reception apparatus 400. The wireless power reception apparatus 400 may be an example of the wireless power reception apparatus 118 described with reference to FIGS. 1, 2 and 3. The wireless power reception apparatus 400 includes a secondary coil 402. The secondary coil 402 may be connected to a rectifier 404 and a capacitor 406. In some implementations, the secondary coil 402 is connected to the rectifier 404 via a series capacitor (not shown), a series switch (not shown), or other electrical components. The rectifier 404 may be electrically coupled to the load 408 or an energy storage device (not shown, such as a battery) through a series switch (not shown). In some implementations, the rectifier 404, the capacitor 406, or both, may be absent in the wireless power reception apparatus, depending on the kind of load 408 (such as heating elements). The wireless power reception apparatus 400 also may include a communication unit 432. The wireless power reception apparatus 400 also may include a communication interface 426, which may include a second communication coil 428. The communication interface 426 may be connected to an RX controller 424.

The receiver controller 424 may receive various information and determine a control error value, a power request value or other feedback to communicate to a wireless power transmission apparatus via the communication unit 432. In FIG. 4, dotted lines represent control or information lines to distinguish from solid lines that represent electrical circuit lines. The control or information lines may include electrical connections to or from a receiver controller 424 and other components of the wireless power reception apparatus 400. In some implementations, the receiver controller 424 may receive information indicating load settings, power requirements or power estimates from a load controller (not shown) connected to the load 408. The receiver controller 424 also may receive voltage information from a voltage sensor 414 that is connected to the rectifier 404. The voltage information may indicate a voltage available to the load 408. However, the voltage sensor 414 may fail or may not be present in some implementations of the example wireless power reception apparatus 400.

The RX controller 424 also may communicate with a wireless power transmission apparatus via the communication interface 426. In some implementations, the RX controller 424 may obtain configuration data from a memory (not shown). The configuration data may be transmitted by the communication interface 426 to the wireless power transmission apparatus. The RX controller 424 also may obtain information indicating load states and/or power estimates from a load controller (not shown) or user interface (not shown). At various times before, during, or after the transfer of wireless power, the communication interface 426 may transmit, to the wireless power transmission apparatus, the aforementioned configuration data, voltage measurement information, coupling information, power request information, load voltage information, the load state, among other examples. The load setting may be a user-selectable setting, such as a temperature setting, cooking time, or motor speed setting, among other examples. In some implementations, the configuration data may include a rated power value and a time parameter associated with an operation of the load 408. For example, the time parameter may indicate an expected time to boil water, toast bread, or cook food based on the load setting. In some instances, the RX controller 424 may transmit some or all of the configuration data to the transmission controller during a handshaking process, as described herein. In some instances, the RX controller 424 may transmit feedback information to a wireless power transmission apparatus. The feedback information may include one or more of a load state, a reference voltage, a power estimate or request for the load, the coupling factor information, the load voltage information, a fault state (when detected by the example wireless power reception apparatus 400), or any combination thereof. A TX controller (not shown) of the wireless power transmission apparatus may modify the wireless power being transmitted to the wireless power reception apparatus 400 based on the feedback information. The communication interface 426 may be configured to communicate messages to the wireless power transmission apparatus during predetermined communication slots. For example, the communication slots may be determined based on a synchronization unit (not shown), clock, or other device. For example, communication slots may occur at times when there is no switching in the wireless power transmission apparatus and may be determined when the coil sensed voltage (at the secondary coil 402) is zero.

Figure 5A:
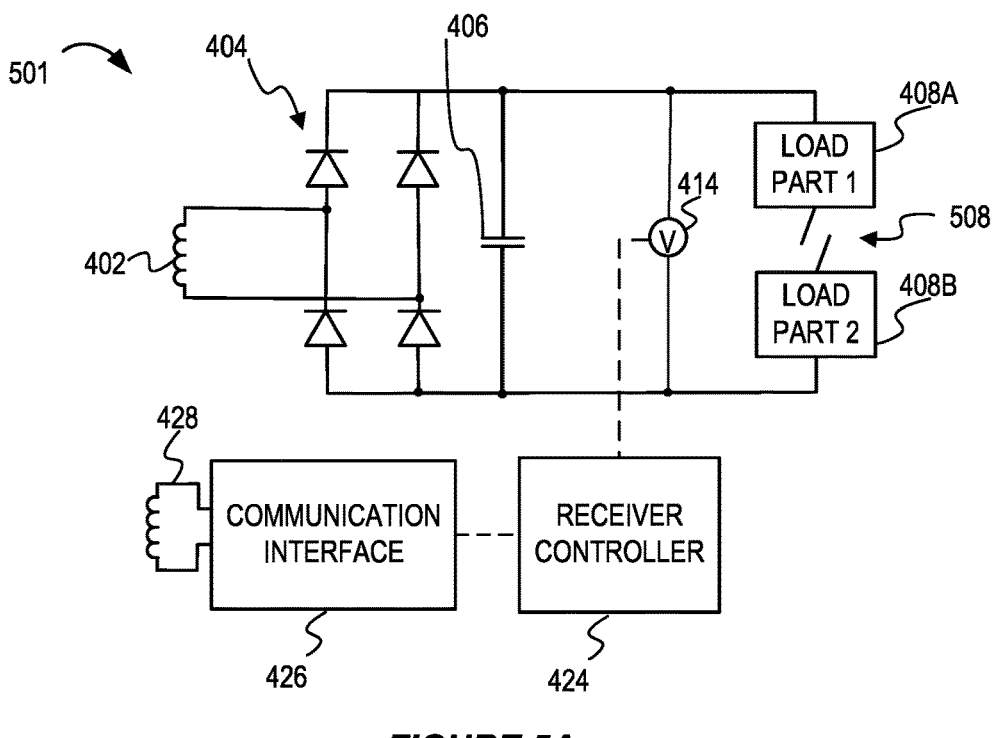
FIG. 5A shows a block diagram conceptually illustrating an example wireless power reception apparatus with an open circuit fault.
Figure 5B:
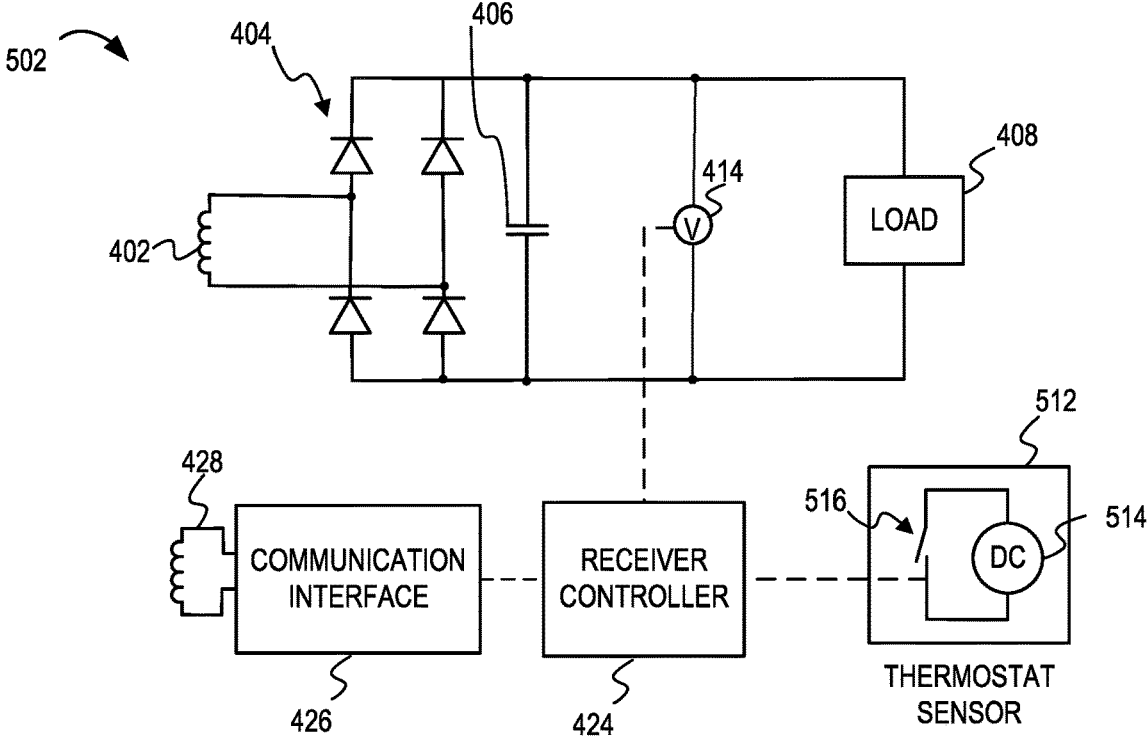
FIG. 5B shows a block diagram conceptually illustrating an example wireless power reception apparatus with a thermostat fault.

As describe further with reference to FIGS. 5A and 5B, there are some faults in the example wireless power reception apparatus 400 that may result in overheating. Typically, the RX controller 424 may detect these faults (at the example wireless power reception apparatus 400) and cause the communication interface 426 to transmit an end power transfer packet. Because the communication interface 426 uses an out-of-band communications channel and may be powered separately from the rest of the receiver components in some instances, it is possible for the communication interface 426 to remain functional even when a fault occurs in a component of the receiver circuit (such as the secondary coil 402, the rectifier 404, the voltage sensor 414, or the load 408). The RX controller 424 may get energised through the bias power (from communication signals) and continue to operate even when there is a fault in the receiver circuit. Using the techniques of this disclosure, the wireless power transmission apparatus can determine (on transmitter side) that there has been a fault in the wireless power reception apparatus. Examples of techniques that can be detected may include an open circuit fault (described with reference to FIG. 5A) and a thermostat failure (described with reference to FIG. 5B).

FIG. 5A shows a block diagram conceptually illustrating an example wireless power reception apparatus 501 with an open circuit fault 508. The wireless power reception apparatus 501 has a secondary coil 402, a rectifier 404, a capacitor 406, a voltage sensor 414, an RX controller 424, a communication interface 426 and a communication coil 428, as described with reference to corresponding components in FIG. 4. The rectifier 404 may be absent in some cases, such as when the wireless power reception apparatus 501 can use AC voltage to power some types of loads. However, the load (shown as load 408 in FIG. 4) may have an open circuit fault 508. For example, there may be a break in a heating element or other circuit of the load, causing the load to split into parts (shown as a first load part 408A and a second load part 408B). The open circuit fault prevents electricity from passing through the receiver circuitry (between the secondary coil 402 and the load 408A/408B). As the wireless power transmission apparatus transmits energy, it cannot be harvested and utilized by the load 408A/408B due to the open circuit fault 508. As a result, that energy may be absorbed by capacitor 406, if present, and the voltage of the capacitor 406 can increase to dangerous levels to cause failure of the capacitor and other associated receiver components. In addition, in many simple appliances, the voltage sensor may be absent and the receiver controller 424 may not be able to detect an open circuit fault or voltage raising to dangerous levels. Even if the capacitor 406 and rectifier 404 were absent, the appliance with open circuit fault will continue to ask for power from the transmitter as it has no means of detecting its own open circuit fault. There is no indication to the user about such an appliance fault which impacts the user experience negatively.

FIG. 5B shows a block diagram conceptually illustrating an example wireless power reception apparatus 502 with a thermostat fault. The wireless power reception apparatus 502 has a secondary coil 402, an optional rectifier 404, an optional capacitor 406, a voltage sensor 414, an RX controller 424, a communication interface 426 and a communication coil 428, as described with reference to corresponding components in FIG. 4. In FIG. 5B, the load 408 may include a heating element. The wireless power reception apparatus 502 may include a thermostat sensor 512 configured to inform the RX controller 424 when the load 408 has reached a particular temperature or as to inform the RX controller 424 when the load 408 is overheating. For example, the thermostat sensor 512 may be constructed with a bimetallic strip 516 connected to a bias voltage 514. The thermostat sensor 512 may include other components (such as a resistor, ground connection, light emitting diode, among other examples, omitted for brevity). The bimetallic strip 516 may be configured to bend unevenly in the presence of temperature of a particular range. When the temperature reaches a certain level, the bimetallic strip 516 should bend enough to open a circuit connected to the bias voltage 514, which causes a signal (such as a voltage on a pin line) to be changed and the changed signal is sent to the RX controller 424. However, the bimetallic strip 516 or the bias voltage 514 may fail. For example, the bimetallic strip 516 may not bend a sufficient amount to open the circuit even when the temperature becomes higher than the certain level at which the bimetallic strip 516 is expected to close the circuit. The power source for the bias voltage 514 may not adequately power the circuit. Other types of faults in the thermostat sensor 512 are possible. Because the RX controller 424 does not receive an overtemperature signal from the failed thermostat sensor 512, the RX controller 424 may continue to communicate a power request or feedback message via the communication interface 426 to the wireless power transmission apparatus. In response, absent the techniques of this disclosure, the wireless power transmission apparatus may continue to deliver wireless power causing further heating to potentially dangerous levels.

FIG. 6 shows a block diagram conceptually illustrating an example wireless power transmission apparatus 600 in which a transmission controller 108 can detect a fault (such as those descried with reference to FIGS. 5A and 5B) based on power measurements. The wireless power transmission apparatuses 600 may include a power source 302, PTx circuit 350 (such as one or more components including an inverter, a capacitor, among other examples), a TX controller 108 and a primary coil 322 as described with reference to FIG. 3. The TX controller 108 may be configured to obtain measurements of the PTx circuit 350 to determine a power transfer amount. For example, the TX controller 108 may obtain measurements of an output voltage and an output current of an inverter (not shown) of the PTx circuit 350 during a power transfer period (such as a half cycle of an AC mains). The TX controller 108 may multiply the measured voltage and current to obtain transmitter power measurement. The TX controller 108 may calculate an average transmitter power (also referred to as average Power Transmitter power) by averaging several transmitter power measurements in a corresponding power transfer period. The average transmitter power may represent how much power is actually transferred from the primary coil 322 to the secondary coil of the wireless power reception apparatus.

When the wireless power reception apparatus has an open circuit fault, the power transfer amount may be lower than a threshold. In some implementations, the TX controller 108 can calculated a power transfer amount based on a difference between the average transmitter power and an expected power transmission loss associated with the PTx circuit 350. The expected power transmission loss may include losses associated with the primary coil 322, ferrites in the wireless power transmission apparatus, losses in the components of the PTx circuit 350, among other examples. The power transfer amount may be calculated by subtracting the expected power transmission loss from the average transmitter power. When the average transmitter power is close (in value) to the expected power transmission loss, the power transfer amount may be low or zero. In such circumstances, the TX controller 108 may infer that power is not being transferred through the primary coil 322 to a wireless power reception apparatus. If the TX controller 108 has received a communication from the wireless power reception apparatus but the power is not being transferred, the TX controller 108 can deduce that there is an open circuit fault in the power receiving circuit of the wireless power reception apparatus.

In some implementations, the TX controller 108 may vary an operating point and recalculate the power transfer amount to confirm the open circuit fault. After detecting the fault, the TX controller 108 may cease the transmission of wireless power via the primary coil 322. In some implementations, the TX controller 108 also may communicate a fault detection message to the wireless power reception apparatus.

FIG. 7 shows a block diagram conceptually illustrating a transmission controller 708 detecting a fault of the wireless power reception apparatus based on measurements at the wireless power transmission apparatus. The TX controller 708 may obtain measurements regarding the PTx circuit. For example, the TX controller 708 may obtain the inverter voltage and current information 712 from voltage and current sensors associated with the inverter of the PTx circuit. In some implementations, the inverter voltage and current information 712 may be measured at an output of the inverter during a power transfer period. A power transfer period may be one or more half cycles of an alternating current (AC) power supply (such as the power source 302 described with reference to FIG. 3) that is coupled to the PTx circuit. A half cycle may be the smallest time period used for measuring the average power transmitted using the inverter. A power transfer period timer 714 may coordinate the measurement period and timing for determining a transmitter power measurement 718.

Using the inverter voltage and current information 712 for a power transfer period and the alternating current (AC) frequency of the power source, the TX controller 708 may determine a transmitted power measurement 718. An average power transfer amount 730 (which may be referred to as Pavg) may be calculated as an average of transmitted power measurements associated with the power transfer period. Formula (Ia) shows an equation to determine the average power transfer amount.

$$Pavg = 2 f_{ac} \int_0^{1/(2 f_{ac})} (Vinv(t) * I_{inv}(t)) dt \qquad (1a)$$

Where $f_{ac}$ is the AC frequency of the power source, Vinv(t) is the instantaneous inverter voltage, $I_{inv}(t)$ is the instantaneous inverter current and dt represents the integration operation with respect to time and for the power transfer period (such as a half cycle of the AC power supply). The above equation in discrete time domain with a sampling time of 'Ts' and containing 'n' samples in half AC cycle can be represented as shown in Formula (1b).

$$Pavg = 2 fac \sum_{k=1}^{n} Vinv(k) * Iinv(k) * Ts \qquad (1b)$$

The TX controller 708 also may adjust the average power transfer amount 730 by subtracting the expected power transmission loss 728. The expected power transmission loss 728 may be based on transmitter characteristics 722. Formula (2) shows an example calculation for the expected power transmission loss 728 (PlossPTX).

$$PlossPTX = Ploss(\text{coil}) + Ploss(\text{electronics}) + Ploss(\text{ferrites}) \qquad (2)$$

Where Ploss(coil) is the loss associated with the primary coil, Ploss(electronics) is the loss associated with other components of the PTx circuit, and Ploss(ferrites) is the loss in the ferrites in the wireless power transmission apparatus.

The TX controller 708 may determine a fault detection threshold 738. The fault detection threshold may be based on the power transfer amount 730 (such as a factor of the power transfer amount 730) or based on a configurable offset value. At block 750, the TX controller 708 may compare the power transfer amount 730 and the fault detection threshold 738. If the power transfer amount 730 (the average transmitted power adjusted based on the expected power transmission loss 728) is below the fault detection threshold 738, the TX controller 708 may determine that a fault of the wireless power reception apparatus has been detected. Alternatively, if the power transfer amount 730 is not below the fault detection threshold 738, the TX controller 708 may not determine the fault and may continue power transfer phase. Formula (3) shows an example comparison for block 750.

$$\text{fault detected when } Pavg \ [-PlossPTX] < FD_{threshold} \qquad (3)$$

where $FD_{threshold}$ is the fault detection threshold 738.

In some instances, the TX controller 708 may record multiple instances of the power transfer amount being below the fault detection threshold before determining that the fault has been detected. For example, the fault may be detected after a threshold quantity of power transfer amounts (over successive power transfer periods) are below the fault detection threshold. In some implementations, the TX controller 708 may adjust an operating parameter (such as an operating frequency) after a first instance of the power transfer amount being below the fault detection threshold. If the power transfer amount remains below the fault detection threshold after changing the operating parameter, the TX controller 708 may determine that the fault is detected. A first instance may cause the TX controller 708 to suspect the fault, which may be confirmed by the second (or multiple) instances of the power transfer amount being below the fault detection threshold. In some implementations, the TX controller 708 may adjust the operating parameter over multiple power transfer periods during a power transfer phase. If the power transfer amounts for each of the power transfer periods remain below the fault detection threshold for a fault detection time period, the TX controller 708 may determine that the fault has been detected.

Figure 8:
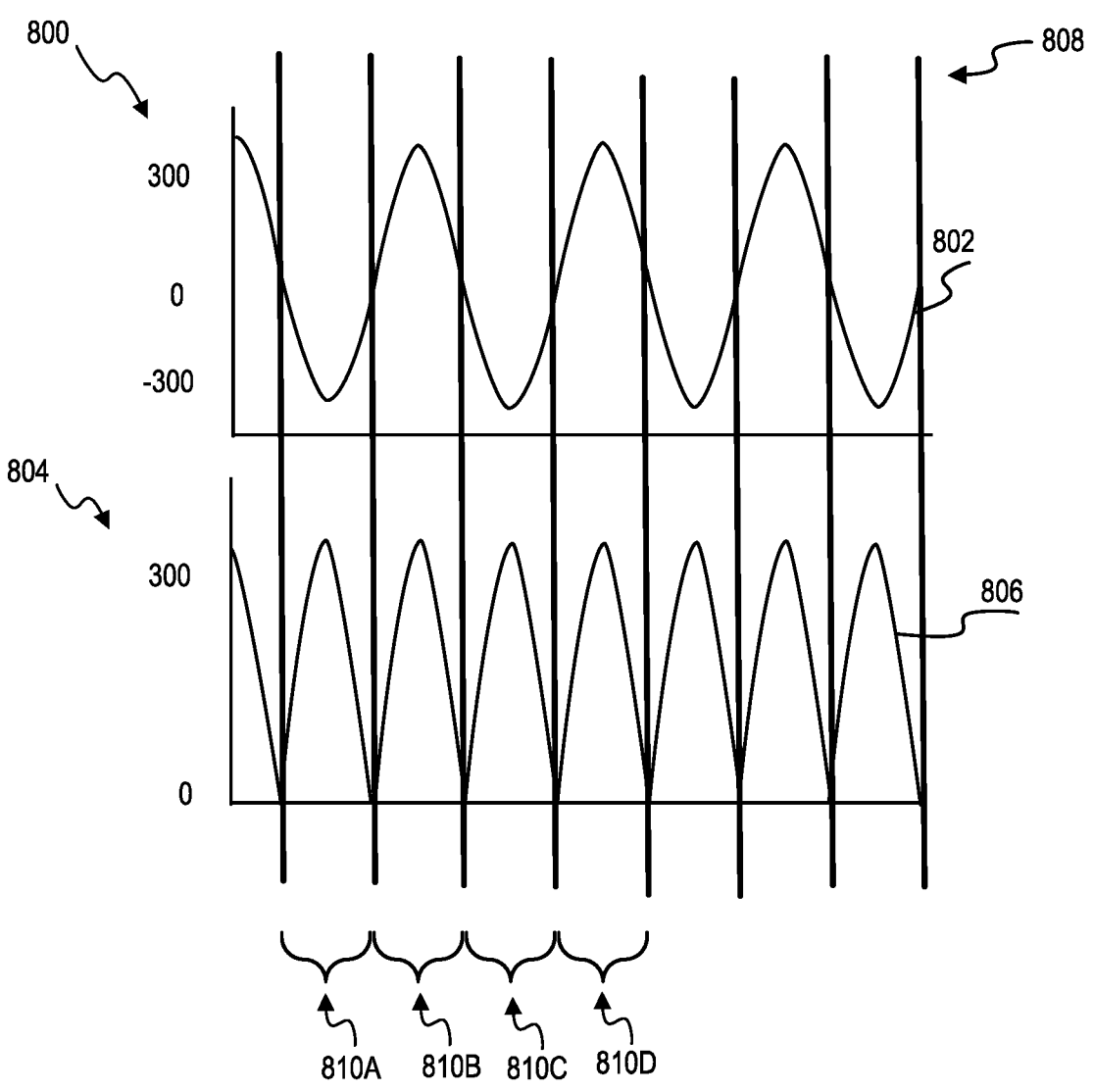
FIG. 8 shows a timing diagram conceptually illustrating power transfer periods in relation to an alternating current cycle.

FIG. 8 shows a timing diagram conceptually illustrating power transfer periods in relation to an alternating current cycle. In FIG. 8, an AC voltage graph 800 shows an AC voltage curve 802. The AC voltage curve 802 may represent an AC voltage from the main terminals feeding the wireless power transmission apparatus (referred to herein as AC mains or AC mains voltage). The AC mains voltage may be an example of the power source 112 or the power source 302 described with reference to FIGS. 1, 3, and 6, respectively. For example, the AC mains frequency may be 50 Hz. In FIG. 8, a DC voltage graph 804 shows a DC voltage curve 806. The DC voltage curve 806 may represent a rectified voltage available after the rectifier in the wireless power transmission apparatus. The DC voltage curve 806 also may represent an output of a smaller rectifier feeding off the AC mains and connecting to a bias power unit that provides power to other electronics in the wireless power transmission apparatus. The lines 808 indicate points at which the AC voltage curve 802 and the DC voltage curve 806 simultaneously have a voltage of 0 V (also referred to as a zero voltage or zero cross event).

The wireless power transmission apparatus may include a synchronization unit that may provide a signal representing the AC voltage curve 802 or the rectified DC voltage curve 806 to the TX controller 108. Near every point at which the AC mains voltage is zero (also referred to as a zero crossing), the TX controller 108 may stop power transfer for a short time (such as approximately 300 microseconds, approximately one millisecond, or any other suitable time period) by disabling a PWM driver to create time slots for other operations. Other operations may include data communication between the wireless power transmission apparatus and the wireless power reception apparatus using NFC, a K-factor determination process, or foreign object detection (FOD) operations, among other examples. In some implementations, an absence of power transfer to the wireless power transmission apparatus during these instances may serve as a clock to the wireless power reception apparatus to synchronize its operation with the wireless power transmission apparatus. Hence, the wireless power transmission apparatus can synchronously cooperate with the wireless power reception apparatus. In some implementations, the zero cross events illustrated as lines 808 are designated a regularly recurring communication slots during which the wireless power reception apparatus communicates with the wireless power transmission apparatus using an out-of-band channel. The time between communication slots may be referred to as power transfer periods. For example, power transfer periods 810A, 810B, 810C, and 810D are each associated with one half cycle of the AC voltage curve.

Figure 9:
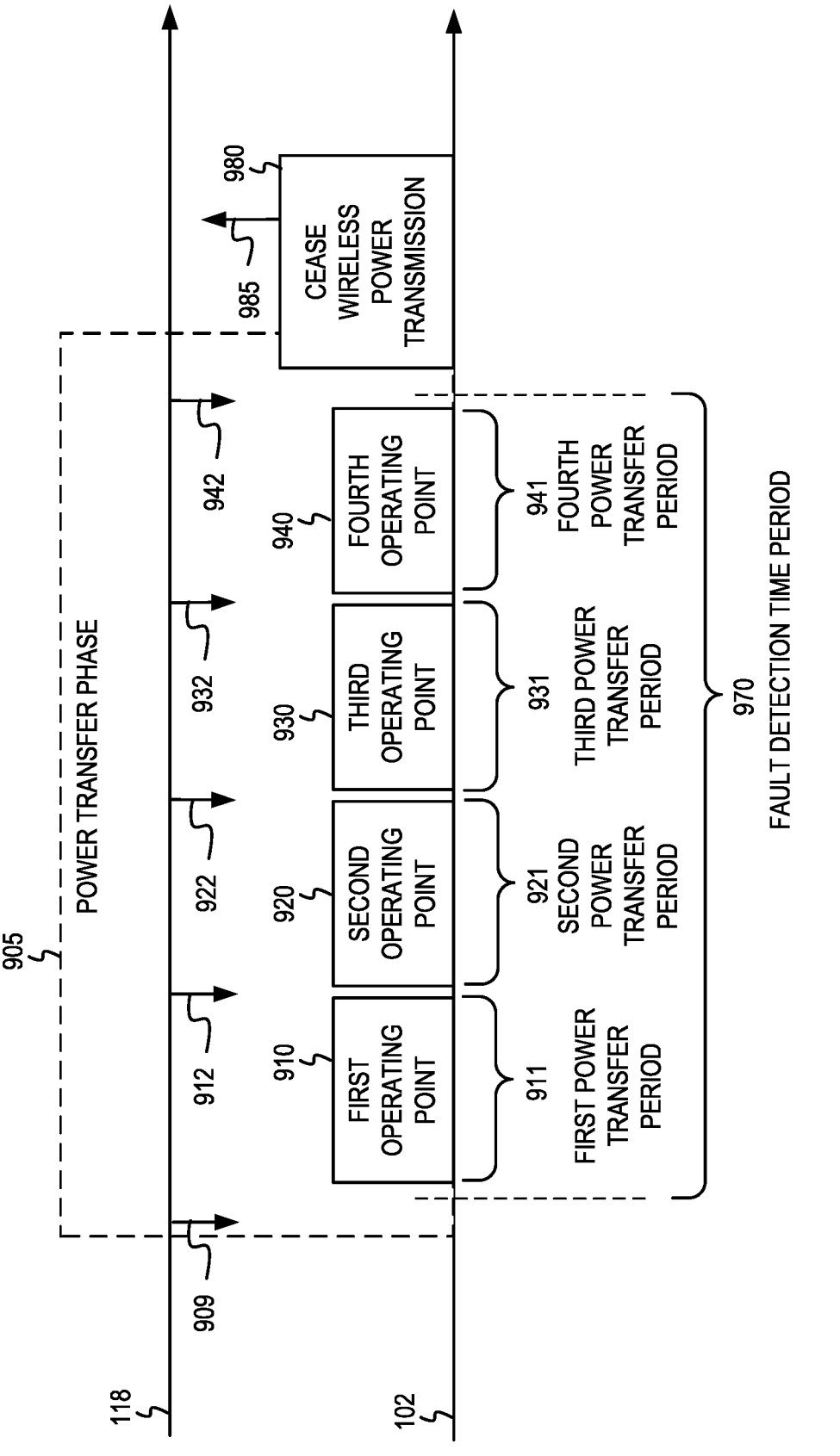
FIG. 9 shows a timing diagram conceptually illustrating a transmission controller adjusting an operating point during various power transfer periods to detect a fault in the wireless power reception apparatus.

FIG. 9 shows a timing diagram 900 conceptually illustrating a transmission controller adjusting an operating point during various power transfer periods to detect a fault in the wireless power reception apparatus. The timing diagram 900 shows a portion of the wireless transmission process between the wireless power transmission apparatus 102 and the wireless power reception apparatus 118. For brevity, the identification, handshake, and configuration phases are omitted from FIG. 9. Rather, FIG. 9 focuses on the power transfer phase 905 that occurs post the identification, handshake, and configuration phases. During the power transfer phase 905, the wireless power transmission apparatus 102 may periodically receive power control communications 909, 912, 922, 932 and 942 from the wireless power reception apparatus 118. For example, the power control communication 909 may include a power request message from the wireless power reception apparatus 118 to the wireless power transmission apparatus 102. During a first power transfer period 911 (such as one or more half cycles of the AC power supply), the TX controller of the wireless power transmission apparatus 102 may cause the wireless power transmission apparatus 102 to transmit power using a first operating point 910. The TX controller may determine that the power transfer amount for that power transfer period is below a fault detection threshold, as described with reference to FIG. 7. Thereafter, the TX controller may cause the wireless power transmission apparatus 102 to transmit power using a second operating point 920 during a second power transfer period 921. For example, the first operating point 910 may use a first operating frequency f1 while the second operating point 920 may use a second operating frequency f2. If the power transfer amount during the second power transfer period 921 remains below the fault detection threshold, the TX controller may determine that there is an open circuit fault of the wireless power reception apparatus 118. In some implementations, the TX controller may continue to use different operating points for successive power transfer periods 911, 921, 931, and 941 until a fault detection criterion is satisfied. FIG. 9 shows a third operating point 930 (such as a third operating frequency f3) used during a third power transfer period 931 and a fourth operating point 940 (such as a fourth operating frequency f4) used during a fourth power transfer period 941.

In some implementations, the fault detection criterion may be based on a threshold quantity of power transfer periods during which the power transfer amount is below the threshold. In some implementations, the fault detection criterion may be based on a threshold quantity of different operating points that have resulted in a power transfer amount remaining below the fault detection threshold. In yet other implementations, the fault detection criterion may be an expiration of a fault detection time period 970.

Once the fault detection criterion is satisfied, the wireless power transmission apparatus 102 may determine that a fault of the wireless power reception apparatus 118 has been detected. The wireless power transmission apparatus 102 may cease wireless power transmission 980. In some implementations, the wireless power transmission apparatus 102 may present an indication of the fault via a user interface of the wireless power transmission apparatus 102. In some implementations, the wireless power transmission apparatus 102 may transmit a fault detection message 985 to the wireless power reception apparatus 118. The wireless power reception apparatus 118 may present an indication of the fault via a user interface of the wireless power reception apparatus 118.

FIG. 10 shows a flow diagram illustrating example operations of a process 1000 in an example wireless power transmission apparatus for detecting a fault of the wireless power reception apparatus. For brevity, the operations are described as performed by an apparatus. The operations of the process 1000 may be implemented by a wireless power transmission apparatus as described herein. For example, the process 1000 may be performed by any one of the wireless power transmission apparatuses or any one of the TX controllers, or the apparatus described with reference to any of the Figures herein.

At block 1010, the apparatus may receive a power request message from a wireless power reception apparatus.

At block 1020, the apparatus may generate power for transmission via a primary coil of the wireless power transmission apparatus.

At block 1030, the apparatus may determine one or more power transfer amounts during one or more power transfer periods based on measurements at the wireless power transmission apparatus.

At block 1040, the apparatus may detect a fault of the wireless power reception apparatus based, at least in part, on the one or more power transfer amounts being below a fault detection threshold.

Figure 11:
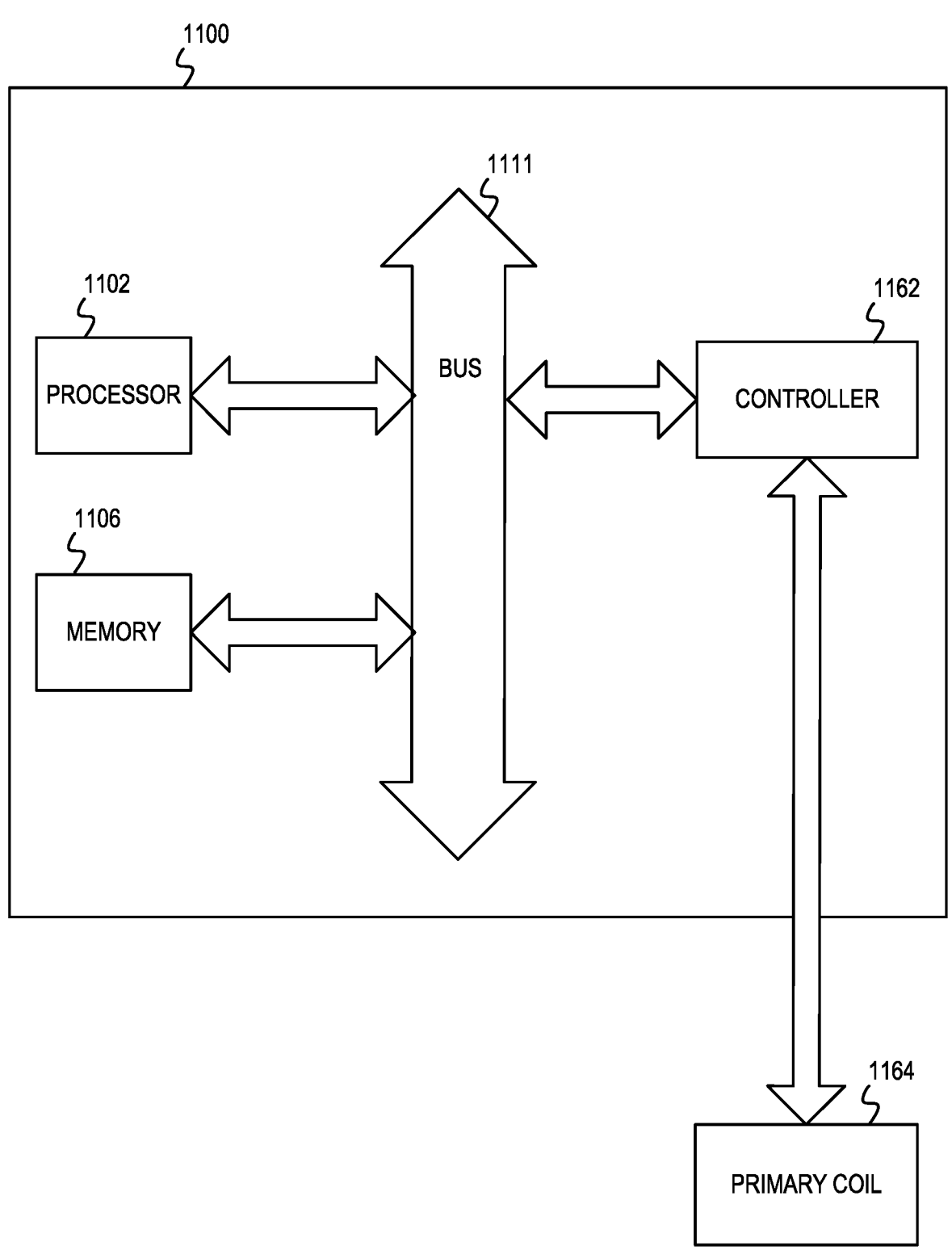
FIG. 11 shows a block diagram of an example apparatus for use in wireless power system.

FIG. 11 shows a block diagram of an example apparatus for use in wireless power system. In some implementations, the apparatus 1100 may be a wireless power transmission apparatus (such as the wireless power transmission apparatus 102) described herein. In some implementations, the apparatus 1100 may be an example of any one of the wireless power transmission apparatuses 102 or 300, or any one of the TX controllers 108 described with reference to any of the Figures herein. The apparatus 1100 can include a processor 1102 (possibly including multiple processors, multiple cores, multiple nodes, or implementing multi-threading, etc.). The apparatus 1100 also can include a memory 1106. The memory 1106 may be system memory or any one or more of the possible realizations of computer-readable media described herein. The apparatus 1100 also can include a bus 1111 (such as PCI, ISA, PCI-Express, HyperTransport®, InfiniBand®, NuBus,® AHB, AXI, etc.).

The apparatus 1100 may include one or more controller(s) 1162 configured to manage multiple primary or secondary coils (such as a coil array 1164). In some implementations, the controller(s) 1162 can be distributed within the processor 1102, the memory 1106, and the bus 1111. The controller(s) 1162 may perform some or all of the operations described herein. For example, the controller(s) 1162 may be a transmission controller, such as any of the transmission controllers described herein.

The memory 1106 can include computer instructions executable by the processor 1102 to implement the functionality of the implementations described with reference to FIGS. 1-10. Any one of these functionalities may be partially (or entirely) implemented in hardware or on the processor 1102. For example, the functionality may be implemented with an application specific integrated circuit, in logic implemented in the processor 1102, in a co-processor on a peripheral device or card, etc. Further, realizations may include fewer or additional components not illustrated in FIG. 11. The processor 1102, the memory 1106, and the controller(s) 1162 may be coupled to the bus 1111. Although illustrated as being coupled to the bus 1111, the memory 1106 may be coupled to the processor 1102.

FIGS. 1-11 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (identified as clauses for reference).

Clauses

Clause 1. A method performed by a wireless power transmission apparatus, including: receiving a power request message from a wireless power reception apparatus; generating power for transmission via a primary coil of the wireless power transmission apparatus; determining one or more power transfer amounts during one or more power transfer periods based on measurements at the wireless power transmission apparatus; and detecting, by the wireless power transmission apparatus, a fault of the wireless power reception apparatus based on the one or more power transfer amounts being below a fault detection threshold.

Clause 2. The method of clause 1, wherein detecting the fault includes: determining a first power transfer amount of the one or more power transfer amounts during a first power transfer period of the one or more power transfer periods; and detecting a first indication of the fault based on a determination that the first power transfer amount is below the fault detection threshold.

Clause 3. The method of clause 2, further including, in response to detecting the first indication of the fault: changing an operating point of the wireless power transmission apparatus for a second power transfer period of the one or more power transfer periods; determining a second power transfer amount of the one or more power transfer amounts during the second power transfer period; detecting a second indication of the fault based on a determination that the second power transfer amount is below the fault detection threshold; and detecting the fault based on the first indication and the second indication.

Clause 4. The method of clause 3, wherein the operating point is an operating frequency of the power generated for transmission via the primary coil, the method further including: generating the power at a first operating frequency during the first power transfer period; and generating the power at a second operating frequency during the second power transfer period.

Clause 5. The method of clause 1, further including: changing an operating point of the wireless power transmission apparatus for each of a plurality of power transfer periods; determining a plurality of power transfer amounts corresponding to the plurality of power transfer periods based on measurements at the wireless power transmission apparatus; and detecting the fault based on the plurality of power transfer amounts being below the fault detection threshold.

Clause 6. The method of clause 5, further including: detecting the fault after a fault detection time period during which the plurality power transfer amounts remain below the fault detection threshold.

Clause 7. The method of clause 5, further including: detecting the fault after a threshold quantity of the plurality power transfer amounts are below the fault detection threshold during a power transfer phase between the wireless power transmission apparatus and the wireless power reception apparatus.

Clause 8. The method of any one of clauses 5-7, wherein the operating point includes at least one member selected from a group consisting of: an operating frequency, an operating voltage, and an operating duty.

Clause 9. The method of any one of clauses 1-8, further including ceasing transmission of power via the primary coil in response to detecting the fault.

Clause 10. The method of any one of clauses 1-9, further including communicating a fault detection message to the wireless power reception apparatus in response to detecting the fault.

Clause 11. The method of any one of clauses 1-10, wherein determining the one or more power transfer amounts includes, for each power transfer amount of the one or more power transfer amounts: measuring a voltage and a current associated with an inverter coupled to the primary coil during a corresponding power transfer period; calculating an input power based on the voltage and the current during the corresponding power transfer period; and determining the power transfer amount based on a difference between the input power and an expected power transmission loss associated with the wireless power transmission apparatus.

Clause 12. The method of clause 11, wherein one or more power transfer periods are consecutive time periods and each of the one or more power transfer periods includes one or more half cycles of an alternating current (AC) power supply coupled to the inverter.

Clause 13. The method of any one of clauses 1-12, further including: detecting the fault of the wireless power reception apparatus regardless of whether the wireless power transmission apparatus continues to receive messages from the wireless power reception apparatus via a communication unit that is separate from the primary coil.

Clause 14. A wireless power transmission apparatus, including: a communication unit configured to receive a power request message from a wireless power reception apparatus; a primary coil; a power signal generator configured to generate power for transmission via the primary coil; a transmission controller configured to: determine one or more power transfer amounts during one or more power transfer periods based on measurements at the wireless power transmission apparatus; and detect a fault of the wireless power reception apparatus based on the one or more power transfer amounts being below a fault detection threshold.

Clause 15. The wireless power transmission apparatus of clause 14, wherein the transmission controller is configured to: determine a first power transfer amount of the one or more power transfer amounts during a first power transfer period of the one or more power transfer periods; and detect a first indication of the fault based on a determination that the first power transfer amount is below the fault detection threshold.

Clause 16. The wireless power transmission apparatus of clause 15, wherein the transmission controller is configured to: in response to detecting the first indication of the fault: change an operating point of the wireless power transmission apparatus for a second power transfer period of the one or more power transfer periods; determine a second power transfer amount of the one or more power transfer amounts during the second power transfer period; detect a second indication of the fault based on a determination that the second power transfer amount is below the fault detection threshold; and detect the fault based on the first indication and the second indication.

Clause 17. The wireless power transmission apparatus of clause 16, wherein the operating point is an operating frequency of the power generated for transmission via the primary coil, and wherein the transmission controller is configured to: cause the power signal generator to generate the power at a first operating frequency during the first power transfer period; and cause the power signal generator to generate the power at a second operating frequency during the second power transfer period.

Clause 18. The wireless power transmission apparatus of clause 14, wherein the transmission controller is configured to: change an operating point of the power signal generator for each of a plurality of power transfer periods; determine a plurality of power transfer amounts corresponding to the plurality of power transfer periods based on measurements at the wireless power transmission apparatus; and detect the fault based on the plurality of power transfer amounts being below the fault detection threshold.

Clause 19. The wireless power transmission apparatus of clause 18, wherein the transmission controller is configured to: detect the fault after a fault detection time period during which the plurality power transfer amounts remain below the fault detection threshold.

Clause 20. The wireless power transmission apparatus of clause 18, wherein the transmission controller is configured to: detect the fault after a threshold quantity of the plurality power transfer amounts are below the fault detection threshold during a power transfer phase between the wireless power transmission apparatus and the wireless power reception apparatus.

Clause 21. The wireless power transmission apparatus of any one of clauses 18-20, wherein the operating point includes at least one member selected from a group consisting of: an operating frequency, an operating voltage, and an operating duty.

Clause 22. The wireless power transmission apparatus of any one of clauses 14-21, wherein the transmission controller is configured to cause the power signal generator to cease transmission of power via the primary coil in response to detecting the fault.

Clause 23. The wireless power transmission apparatus of any one of clauses 14-22, further including: the communication unit configured to communicate a fault detection message to the wireless power reception apparatus in response to the transmission controller detecting the fault.

Clause 24. The wireless power transmission apparatus of any one of clauses 14-23, further including: an inverter of the power signal generator; and a voltage sensor and a current sensor coupled to the inverter and configured to measure a voltage and a current, respectively, associated with the inverter, wherein the transmission controller is configured to, for each power transfer amount of the one or more power transfer amounts: calculate an input power based on the voltage and the current during a corresponding power transfer period; and determine the power transfer amount based on a difference between the input power and an expected power transmission loss associated with the wireless power transmission apparatus.

Clause 25. The wireless power transmission apparatus of clause 24, wherein one or more power transfer periods are consecutive time periods and each of the one or more power transfer periods includes one or more half cycles of an alternating current (AC) power supply coupled to the inverter.

Clause 26. The wireless power transmission apparatus of any one of clauses 14-25, wherein the transmission controller is configured to detect the fault regardless of whether the communication unit continues to receive messages from the wireless power reception apparatus.

Another innovative aspect of the subject matter described in this disclosure can be implemented as a computer-readable medium having stored therein instructions which, when executed by a processor, causes the processor to perform any one of the above-mentioned functionalities.

Another innovative aspect of the subject matter described in this disclosure can be implemented as a system having means for implementing any one of the above-mentioned functionalities.

Another innovative aspect of the subject matter described in this disclosure can be implemented as an apparatus having one or more processors configured to perform one or more operations from any one of the above-mentioned methods.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method performed by a Power Transmitter, comprising:
  generating power for transmission from the Power Transmitter to a Power Receiver;
  obtaining transmitter power measurements at an output of an inverter of the Power Transmitter during a power transfer period;
  calculating a transmitter power based on an average of the transmitter power measurements;
  calculating a power transfer amount for the power transfer period based, at least in part, on a difference between the transmitter power and an expected power transmission loss associated with the Power Transmitter; and
  protecting, by the Power Transmitter, against a fault of the Power Receiver when the power transfer amount is below a threshold during a power transfer phase.

2. The method of claim 1, further comprising:
  calculating a plurality of power transfer amounts including at least a first power transfer amount during a first power transfer period of a plurality of power transfer periods; and detecting the fault when at least the first power transfer amount is below the threshold.

3. The method of claim 2, further comprising:
changing an operating point of the Power Transmitter for a second power transfer period of the plurality of power transfer periods;
calculating a second power transfer amount of the plurality of power transfer amounts during the second power transfer period; and
detecting the fault when both the first power transfer amount and the second power transfer amount is below the threshold.

4. The method of claim 3, wherein the operating point is an operating frequency of the power generated by the Power Transmitter, the method further comprising:
generating the power at a first operating frequency during the first power transfer period; and
generating the power at a second operating frequency during the second power transfer period.

5. The method of claim 1, further comprising:
changing an operating point of the Power Transmitter for each of a plurality of power transfer periods;
determining a plurality of power transfer amounts corresponding to the plurality of power transfer periods based on measurements of voltage and current of the power generated at the Power Transmitter; and
detecting the fault based on the plurality of power transfer amounts being below the threshold.

6. The method of claim 5, further comprising:
detecting the fault after a fault detection time period during which the plurality power transfer amounts remain below the threshold.

7. The method of claim 5, further comprising:
detecting the fault after a threshold quantity of the plurality power transfer amounts are below the threshold during the power transfer phase.

8. The method of claim 1, wherein protecting against the fault includes ceasing transmission of power from the Power Transmitter.

9. The method of claim 1, wherein protecting against the fault includes communicating a fault detection message to the Power Receiver to indicate that the Power Transmitter has detected the fault.

10. The method of claim 1,
wherein obtaining transmitter power measurements includes:
measuring voltage and current at the inverter of the Power Transmitter during the power transfer period; and
multiplying the measured voltage and current to obtain the transmitter power measurements; and
wherein calculating the one or more power transfer amounts includes averaging the transmitter power measurements to calculate the transmitter power associated with the power transfer period.

11. The method of claim 1, wherein the power transfer period includes one or more half cycles of an alternating current (AC) power supply coupled to the power transmitter.

12. The method of claim 1, further comprising:
detecting the fault of the Power Receiver regardless of whether the Power Transmitter receives power control messages from the Power Receiver.

13. The method of claim 1, further comprising:
setting the threshold based on at least one member selected from a group consisting of:
a pre-determined fault detection threshold;
a factor based on one or more power transfer amounts;
a factor based on a measured current associated with a primary coil of the Power Transmitter; and
a configurable offset value.

14. The method of claim 1, further comprising:
detecting the fault when any one of the-measurements of the Power Transmitter indicate a current that is above an overcurrent threshold.

15. A Power Transmitter, comprising:
a power transmitter circuit including an inverter and a primary coil to generate power for transmission from the Power Transmitter to a Power Receiver; and
a transmission controller configured to:
obtain transmitter power measurements at an output of the inverter during a power transfer period,
calculate a transmitter power based on an average of the transmitter power measurements,
calculate a power transfer amount for the power transfer period based, at least in part, on a difference between the transmitter power and an expected power transmission loss associated with the Power Transmitter, and
protect against a fault of the Power Receiver when the power transfer amount is below a threshold during a power transfer phase.

16. The Power Transmitter of claim 15, wherein the transmission controller is configured to:
calculate a plurality of power transfer amounts including at least a first power transfer amount during a first power transfer period of a plurality of power transfer periods; and
detect the fault when at least the first power transfer amount is below the threshold.

17. The Power Transmitter of claim 16, wherein the transmission controller is configured to:
change an operating point of the power transmitter circuit for a second power transfer period of the plurality of power transfer periods;
calculate a second power transfer amount of the plurality of power transfer amounts during the second power transfer period; and
detect the fault when both the first power transfer amount and the second power transfer amount is below the threshold.

18. The Power Transmitter of claim 17, wherein the operating point is an operating frequency of the power generated by the power transmitter circuit, and wherein the transmission controller is configured to:
cause the power transmitter circuit to generate the power at a first operating frequency during the first power transfer period; and
cause the power transmitter circuit to generate the power at a second operating frequency during the second power transfer period.

19. The Power Transmitter of claim 15, wherein the transmission controller is configured to:
change an operating point of the power transmitter circuit for each of a plurality of power transfer periods;
determine a plurality of power transfer amounts corresponding to the plurality of power transfer periods based on measurements of voltage and current at an inverter of the power transmitter circuit; and
detect the fault based on the plurality of power transfer amounts being below the threshold.

20. The Power Transmitter of claim 19, wherein the transmission controller is configured to:
detect the fault after a fault detection time period during which the plurality power transfer amounts remain below the threshold or after a threshold quantity of the plurality power transfer amounts are below the threshold during the power transfer phase.

21. The Power Transmitter of claim 15, wherein the transmission controller is configured to protect against the fault by causing the power transmitter circuit to cease generation of the power.

22. The Power Transmitter of claim 15, further comprising:

a communication unit configured to communicate a fault detection message to the Power Receiver to indicate that the transmission controller has detected the fault.

23. The Power Transmitter of claim 15, further comprising:

a voltage sensor and a current sensor coupled to the inverter and configured to measure voltage and current, respectively, associated with the output of the inverter, wherein the transmission controller is configured to:

multiply the measured voltage and current to obtain the transmitter power measurements, and average the transmitter power measurements to calculate the transmitter power associated with the power transfer period.

24. The Power Transmitter of claim 15, wherein the power transfer period includes one or more half cycles of an alternating current (AC) power supply coupled to the power transmitter.

25. The Power Transmitter of claim 15, further comprising:

a communication unit, wherein the transmission controller is configured to detect the fault regardless of whether the communication unit receives messages from the Power Receiver.

26. The method of claim 1, wherein the fault includes an open circuit as a result of at least one of:

a blown fuse in the Power Receiver, a failure of a heating element, thermal fuse, or a disconnect switch of the Power Receiver, an open relay contact in the Power Receiver, an open diode in a converter of the Power Receiver.

* * * * *